United States Patent
Kohara

(10) Patent No.: US 10,531,160 B2
(45) Date of Patent: Jan. 7, 2020

(54) CONTENT TRANSMISSION APPARATUS, CONTENT DELIVERY SYSTEM, AND CONTENT TRANSMISSION METHOD

(71) Applicant: YAMAHA CORPORATION, Hamamatsu-shi (JP)

(72) Inventor: Osamu Kohara, Hamamatsu (JP)

(73) Assignee: YAMAHA CORPORATION, Hamamatsu-Shi (JP)

( * ) Notice: Subject to any disclaimer, the term of this patent is extended or adjusted under 35 U.S.C. 154(b) by 0 days.

(21) Appl. No.: 15/894,045

(22) Filed: Feb. 12, 2018

(65) Prior Publication Data

US 2018/0167695 A1 Jun. 14, 2018

Related U.S. Application Data

(63) Continuation of application No. PCT/JP2016/073063, filed on Aug. 5, 2016.

(30) Foreign Application Priority Data

Aug. 19, 2015 (JP) .................................. 2015-162184

(51) Int. Cl.
*H04N 21/6375* (2011.01)
*H04N 21/436* (2011.01)
(Continued)

(52) U.S. Cl.
CPC ......... *H04N 21/6375* (2013.01); *G10L 19/00* (2013.01); *H04N 21/436* (2013.01); *H04N 21/43637* (2013.01); *G10L 19/24* (2013.01)

(58) Field of Classification Search
CPC .......... H04N 21/6375; H04N 21/8113; H04N 21/4398; H04N 21/43637; H04N 21/4307;
(Continued)

(56) References Cited

U.S. PATENT DOCUMENTS 7,061,863 B2 6/2006 Watanabe et al.
7,385,921 B2 6/2008 Itakura et al.
(Continued)

FOREIGN PATENT DOCUMENTS

JP 2001177573 A 6/2001
JP 2003152544 A 5/2003
(Continued)

OTHER PUBLICATIONS

International Search Report issued in International Application No. PCT/JP2016/073063 dated Oct. 18, 2016. English translation provided.

(Continued)

*Primary Examiner* — Benjamin R Bruckart
*Assistant Examiner* — Tien M Nguyen
(74) *Attorney, Agent, or Firm* — Rossi, Kimms & McDowell LLP

(57) ABSTRACT

A content delivery system includes a content transmission apparatus that includes at least one processor configured to implement stored instructions and execute a plurality of tasks. The plurality of tasks include a compression task, a transmission task, and a reception task. The compression task performs compression of content dividing thereof into a fundamental component and an extended component. The transmission task transmits content to a client apparatus. The reception task receives a retransmission request for the content. The transmission task determines, depending on a communication condition, whether to transmit the fundamental component of the content or both the fundamental component and the extended component of the content together. The transmission task, upon the reception task receiving the retransmission request, retransmits only the fundamental component of the content that corresponds to the retransmission request.

17 Claims, 9 Drawing Sheets

(51) Int. Cl.
*G10L 19/24* (2013.01)
*H04N 21/4363* (2011.01)
*G10L 19/00* (2013.01)

(58) Field of Classification Search
CPC ............ H04N 21/43615; H04N 21/436; G10L 19/00; G10L 19/24
See application file for complete search history.

(56) References Cited

U.S. PATENT DOCUMENTS

| | | | | |
|---|---|---|---|---|
| 2005/0249240 | A1* | 11/2005 | Boyce | G10L 19/24 370/469 |
| 2009/0248424 | A1* | 10/2009 | Koishida | G10L 19/24 704/503 |
| 2010/0002726 | A1* | 1/2010 | Kameyama | H04N 21/2383 370/470 |
| 2011/0039595 | A1* | 2/2011 | Luo | H04W 52/243 455/522 |
| 2012/0300663 | A1 | 11/2012 | Lu et al. | |
| 2012/0315017 | A1 | 12/2012 | Matsushita et al. | |
| 2013/0003579 | A1* | 1/2013 | Lu | H04L 47/10 370/252 |
| 2014/0161176 | A1* | 6/2014 | Sun | H04N 19/31 375/240.02 |

FOREIGN PATENT DOCUMENTS

| | | |
|---|---|---|
| JP | 2003241799 A | 8/2003 |
| JP | 2010287039 A | 12/2010 |
| JP | 2012256994 A | 12/2012 |
| JP | 2013518511 A | 5/2013 |
| JP | 2014527739 A | 10/2014 |
| WO | 2013005478 A1 | 1/2013 |

OTHER PUBLICATIONS

Written Opinion issued in International Application No. PCT/JP2016/073063 dated Oct. 18, 2016.

Office Action issued in Japanese Appln. No. 2015-162184 dated Jul. 9, 2019. English translation provided.

* cited by examiner

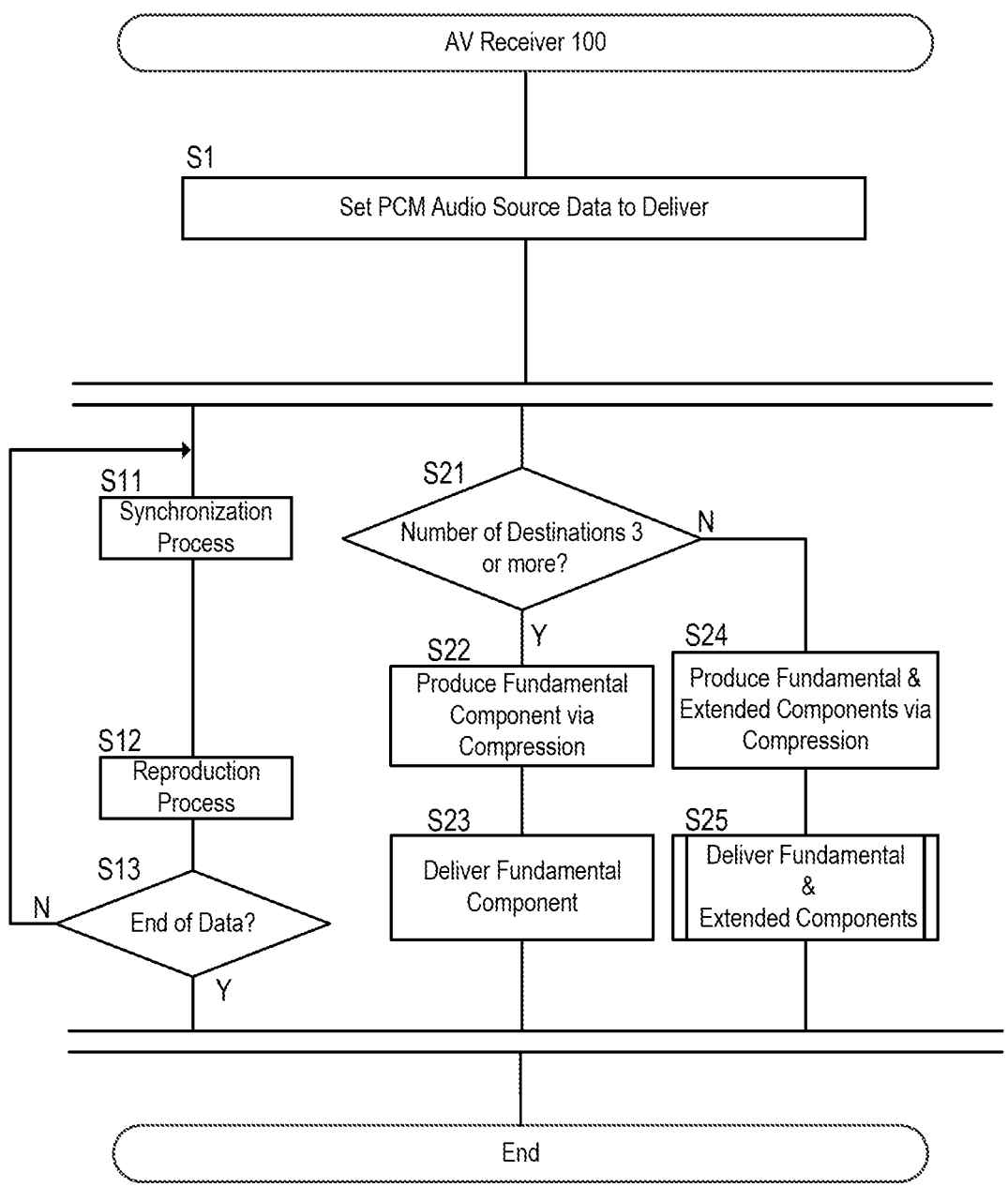

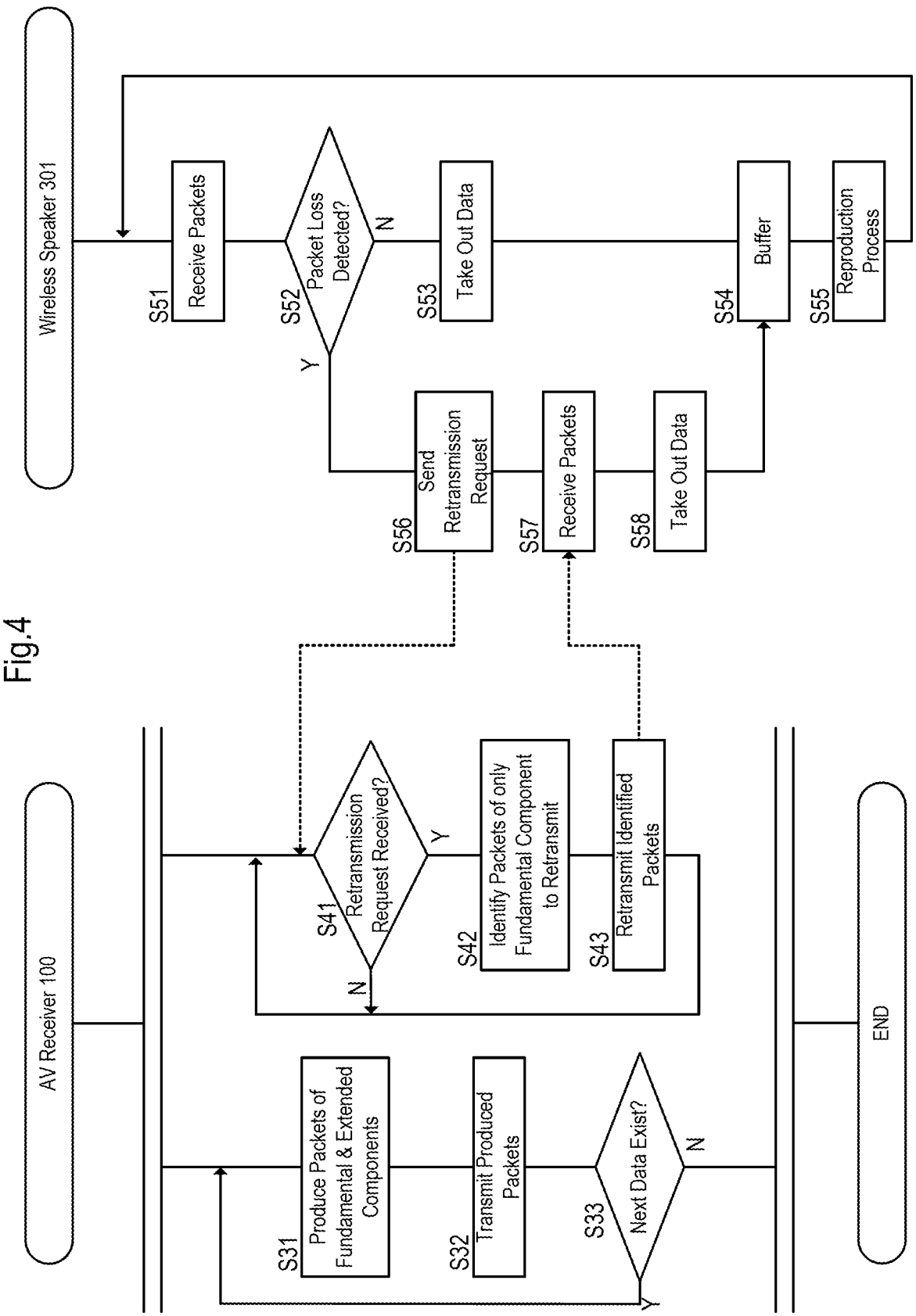

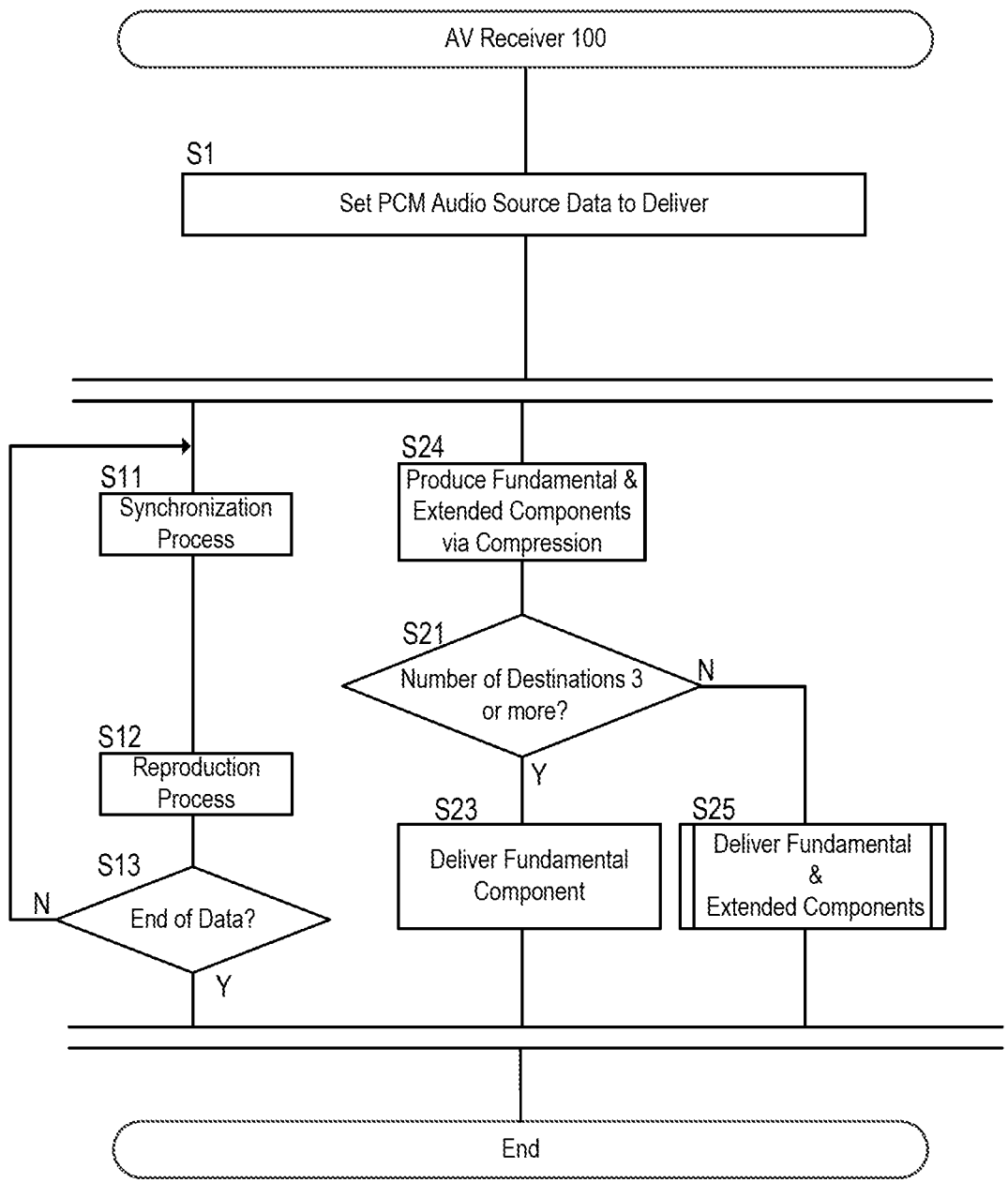

CONTENT TRANSMISSION APPARATUS, CONTENT DELIVERY SYSTEM, AND CONTENT TRANSMISSION METHOD

CROSS REFERENCE TO RELATED APPLICATIONS

The present application is a continuation application of International Patent Application No. PCT/JP2016/073063, filed on Aug. 5, 2016, which claims priority to Japanese Patent Application No. 2015-162184, filed on Aug. 19, 2015. The contents of these applications are incorporated herein by reference in their entirety.

BACKGROUND OF THE INVENTION

1. Field of the Invention

Preferred embodiments of the present invention relates to a content delivery system, a content transmission apparatus, and a content transmission method, that transmit content to a client apparatus.

2. Description of the Related Art

Conventionally, a content transmission apparatus that transmits video data through a network, and a plurality of client apparatuses (televisions) that reproduce the transmitted video data has been known (see Japanese Unexamined Patent Application Publication No. 2012-256994, for example).

But in prior art content transmission apparatus, if, for example, a user environment has a relatively narrow network bandwidth, there may arise delays in content transmission. As a result, the client apparatus becomes, for example, unable to reproduce the content without interruption.

On the other hand, if the content transmission apparatus transmits low-capacity content (low bit-rate content, for example), the client apparatus is capable of reproducing the content without interruption even under the narrow network bandwidth environment. The content transmission apparatus transmitting low bit-rate content, however, results in quality deterioration of the content that is reproduced at all the client apparatuses. Consequently, it follows that the client apparatus is unable to reproduce any content other than low-quality content even under an environment where the network bandwidth is relatively broad.

SUMMARY OF THE INVENTION

One aspect of the present invention is a content transmission apparatus that can prevent delays in content transmission while transmitting as much higher quality content as possible depending on each user's environment.

The content transmission apparatus includes at least one processor configured to implement stored instructions and execute a plurality of tasks, including a compression task, a transmission task, and a reception task. The compression task performs compression of data to divide content thereof into a fundamental component and an extended component. The transmission task transmits content to a client apparatus. The reception task receives a retransmission request for the content. The transmission task determines, depending on a communication condition, whether to transmit the fundamental component of the content or both the fundamental component and the extended component of the content together. The transmission task, upon the reception task receiving the retransmission request, retransmits only the fundamental component of the content that corresponds to the retransmission request.

Preferred embodiments of the present invention can prevent delays in content transmission while transmitting as much higher quality content as possible depending on each user's environment.

The above and other elements, features, characteristics, and advantages of the present invention will become more apparent from the following detailed description of the preferred embodiments with reference to the attached drawings.

BRIEF DESCRIPTION OF THE DRAWINGS

FIG. 3 is a flow chart showing an entire operation of the AV receiver in the embodiment 1.

FIG. 4 is a flow chart showing operations of the AV receiver and the wireless speaker that deliver audio data.

FIG. 9 is a flow chart showing another entire operation of the AV receiver.

DETAILED DESCRIPTION

Figure 1:
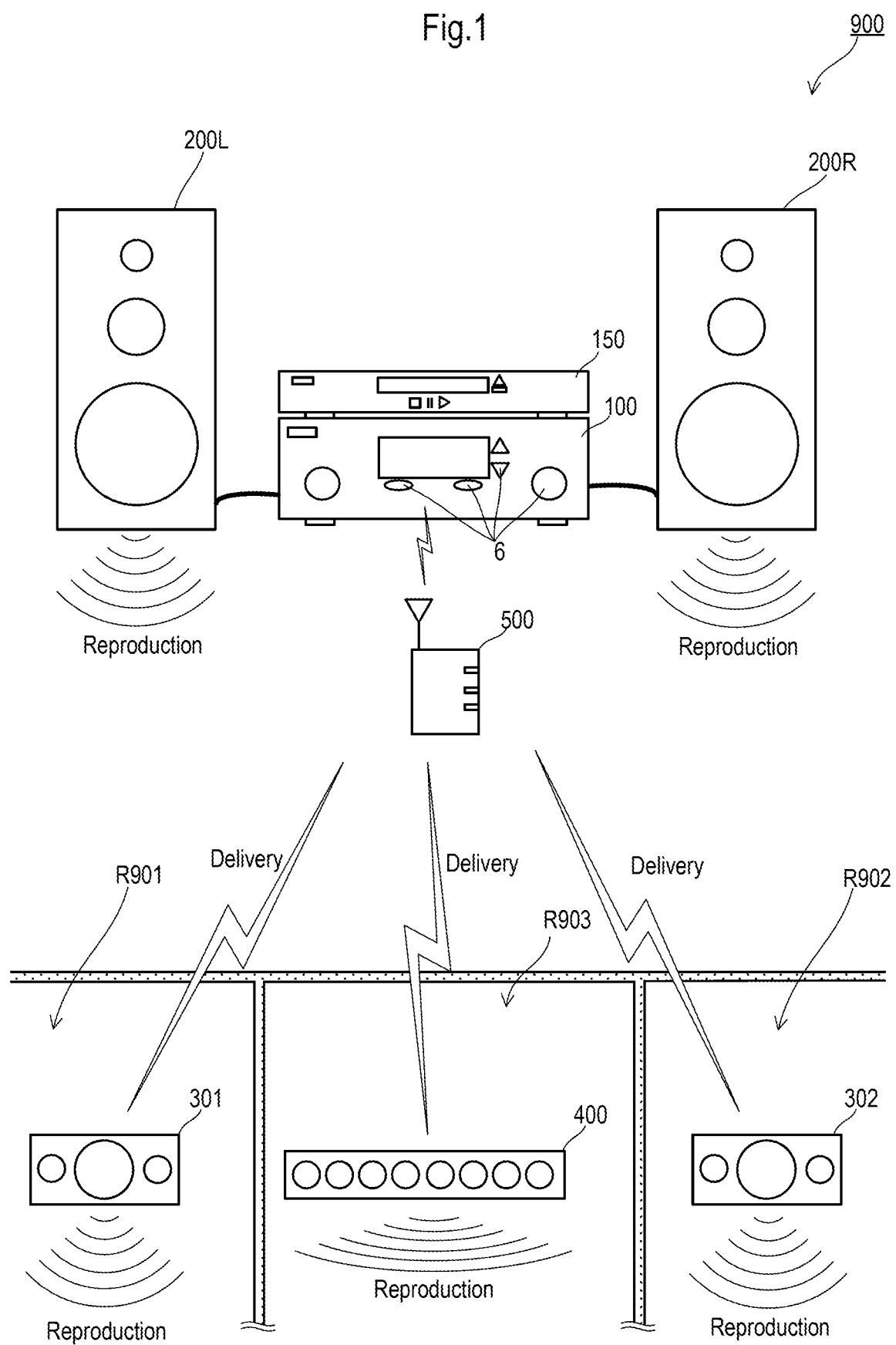
FIG. 1 is an illustration to explain an outline of a content delivery system according to an embodiment 1 of the present invention.

A content transmission apparatus according to a preferred embodiment of the present invention includes at least one processor configured to implement stored instructions and execute a plurality of tasks, including a compression task, a transmission task, and a reception task. The compression task performs compression of content dividing thereof into a fundamental component and an extended component. The transmission task transmits content to a client apparatus. The reception task receives a retransmission request for the content. The transmission task determines, depending on a communication condition, whether to transmit the fundamental component of the content or both the fundamental component and the extended component of the content together. The transmission task, upon the reception task receiving the retransmission request, retransmits only the fundamental component of the content that corresponds to the retransmission request.

For example, the WavPack codec, which is an audio compression codec, divides audio data into a fundamental component and an extended component, and produces two compressed data. Using the compressed data of the fundamental component alone still makes it possible to reproduce the audio. Using the compressed data of both the fundamental component and the extended component makes it possible to reproduce high quality audio data.

Communication conditions include, for example, a condition relating to the number of pieces of the client apparatus as transmission destinations, and conditions relating to network connection modes of the client apparatus as transmission destinations. These communication conditions are among those that affect a network bandwidth of a user's environment. For example, a network bandwidth that is available for the content transmission narrows with the increase in the number of pieces of the client apparatus.

In a case where the network bandwidth of the user's environment is relatively broad, the content transmission apparatus transmits both the fundamental component and the extended component of the content. That is, in the case where the network bandwidth of the user's environment is relatively broad, the content transmission apparatus transmits high quality content.

In a case where the network bandwidth of the user's environment is relatively narrow, the content transmission apparatus transmits the fundamental component alone, without transmitting the extended component. Thus, even in the case where the network bandwidth of the user's environment is relatively narrow, the content transmission apparatus prevents transmission delays by reducing data size of the content to transmit.

In the content transmission apparatus according to a preferred embodiment of the present invention, when the reception task receives a retransmission request, the transmission task retransmits only the fundamental component of the content that corresponds to the retransmission request.

For example, even when retransmission of the content becomes necessary as a result of a narrowing change of the network bandwidth during transmission, the content transmission apparatus, since it retransmits only the fundamental component of the content, reduces data size of the content to retransmit. The content transmission apparatus reduces the data size of the content to retransmit, preventing retransmission delay as well.

Figure 2A:
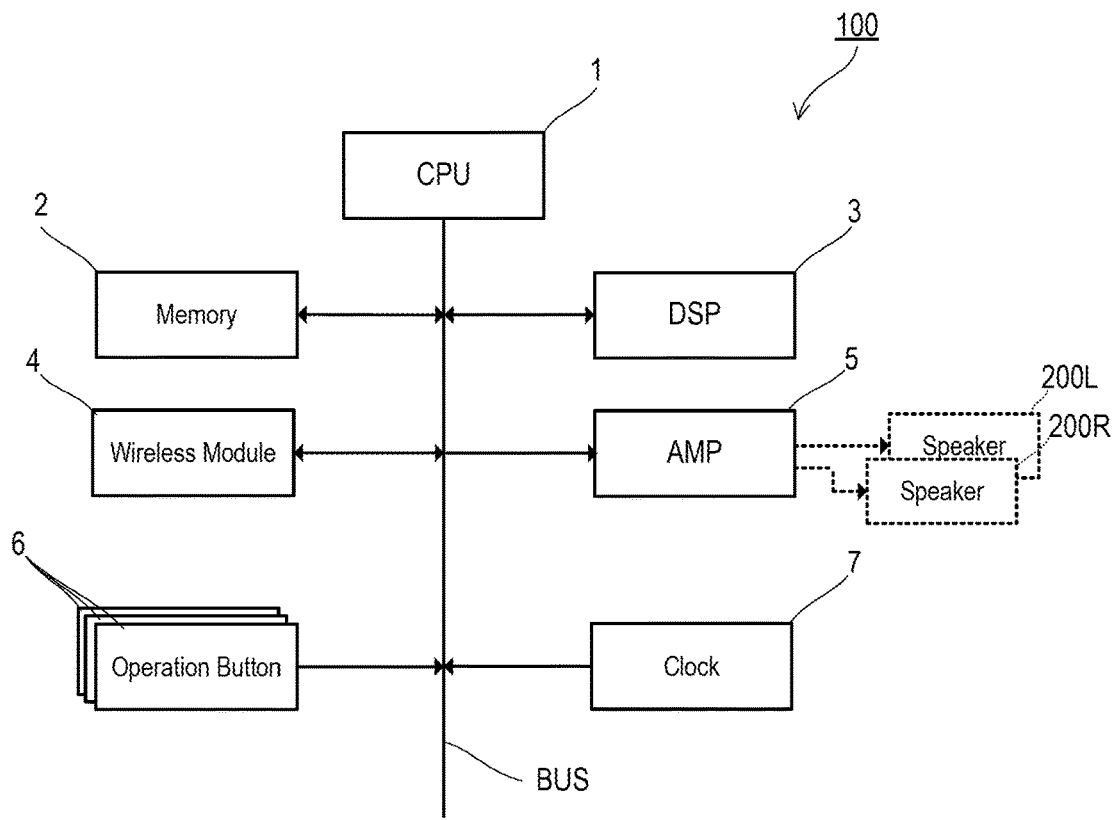
FIG. 2A is a hardware block diagram showing a part of a configuration of an AV receiver.
Figure 2B:
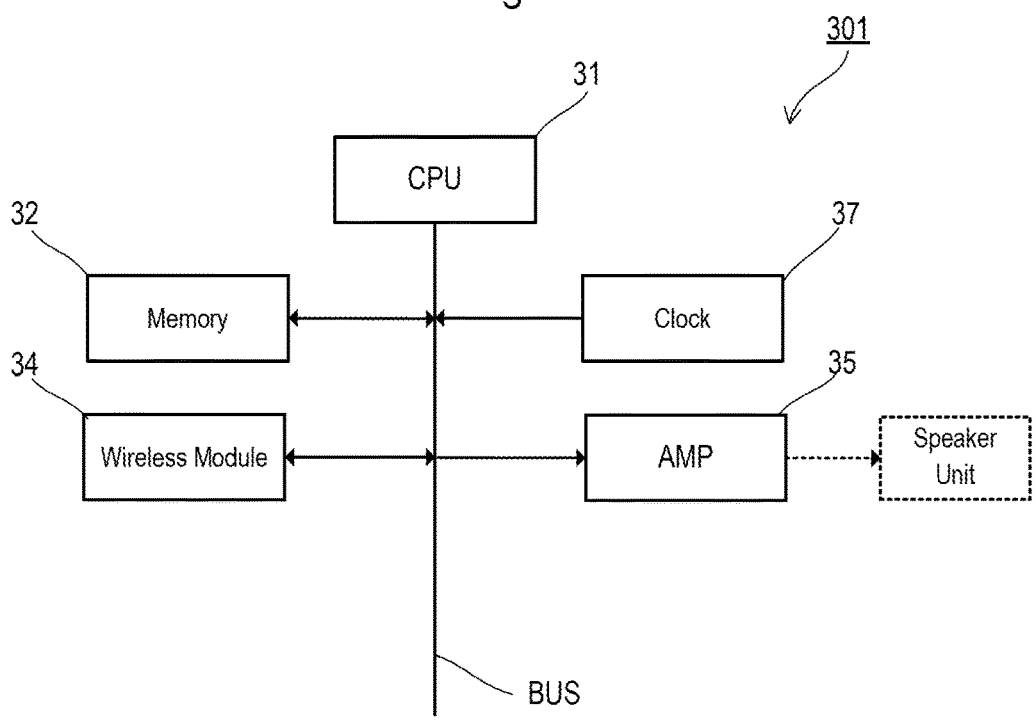
FIG. 2B is a hardware block diagram showing a part of a configuration of a wireless speaker.

A content delivery system 900 according to an embodiment 1 of the present invention is explained, referring to FIG. 1, FIGS. 2A and 2B. FIG. 1 is an illustration to explain an outline of the content delivery system 900. FIG. 2A is a hardware block diagram showing a part of a configuration of an AV receiver 100. FIG. 2B is a hardware block diagram showing a part of a configuration of a wireless speaker 301.

As shown in FIG. 1, the content delivery system 900 includes an AV receiver 100, a content storage apparatus 150, a speaker 200L, a speaker 200R, a wireless speaker 301, a wireless speaker 302, and a bar speaker 400. The wireless speaker 301 is installed in a room R901. The wireless speaker 302 is installed in a room R902. The bar speaker 400 is installed in a room R903. The rooms R901-R903 and a room in which the AV receiver 100 is installed are separate from each other.

The AV receiver 100 performs, through a wireless access point 500, radio communication with the wireless speaker 301, the wireless speaker 302 and the bar speaker 400. The AV receiver 100, by performing the radio communication, delivers the audio data acquired from the content storage apparatus 150 to the wireless speaker 301, the wireless speaker 302, and the bar speaker 400. The delivered audio data are reproduced at the wireless speaker 301, the wireless speaker 302, and the bar speaker 400. Further, the AV receiver 100 reproduces the audio data to deliver also at its own apparatus using the speaker 200L and the speaker 200R. The content delivery system 900 causes the same audio data to be reproduced synchronously at the AV receiver, the wireless speakers 301, 302, and the bar speaker 400. But for the present invention, it is not essential to cause the audio data to be reproduced synchronously at the AV receiver, the wireless speakers 301, 302, and the bar speaker 400. Also, FIG. 1 merely shows an example, so that the number of the speakers as audio data's destinations is not limited to 3.

The AV receiver 100 is an example of a content transmission apparatus of the present invention. The wireless speakers 301, 302 and the bar speaker 400 are respectively examples of client apparatus of the present invention. In this embodiment, the AV receiver 100 prevents delays in audio data delivery while delivering as much higher quality audio data as possible depending on each user's environment (the number of speakers as destinations).

As shown in FIG. 2A, the AV receiver 100 can include a CPU (Central Processing Unit) 1, a memory 2, a DSP (Digital Signal Processor) 3, a wireless module 4, an AMP (Amplifier) 5, a plurality of operation buttons 6, and a clock 7. These components are connected to a common BUS.

The DSP 3 is a processor for a variety of acoustic treatments to the audio data. The wireless module 4 produces wireless signals according to Wi-Fi (a registered trademark) standard and/or the like. Also, the wireless module 4 inputs and outputs wireless signals through an antenna (not shown). Thus, the wireless module 4 transmits and receives information by means of wireless communication. The AMP 5 is a circuit to amplify audio signals. The audio signals amplified by the AMP 5 are output to the speaker 200L and speaker 200R. The plurality of operation buttons 6 respectively output signals indicating operations when being operated by the user. But the AV receiver 100 can accept user's operations through a remote controller.

The clock 7 outputs time information. The time information output from the clock 7 is used in a below-mentioned synchronization process. The memory 2 stores identification information on the wireless speakers 301, 302 and the bar speaker 400. The identification information includes IP addresses. The memory 2 also stores programs. Moreover, the memory 2 also serves as a FIFO (First in, First Out) that temporarily retains the content. The CPU 1 reads out a program from the memory 2 and executes the read-out program. The transmission task and the reception task of the present invention are realized through the execution of the programs.

As shown in FIG. 2B, the wireless speaker 301 can include a CPU 31, a memory 32, a wireless module 34, an AMP 35 and a clock 37. These components are connected to a common BUS.

The wireless module 34 produces wireless signals according to Wi-Fi (a registered trademark) standard and/or the like. Also, the wireless module 34 inputs and outputs wireless signals through an antenna (not shown). Thus, the wireless module 34 transmits and receives information by means of wireless communication. The AMP 35 is a circuit that amplifies audio signals. The audio signals amplified by the AMP 35 are output to a speaker unit. The clock 37 outputs time information. The time information output from the clock 37 is used in time measurement for timing the start of the audio data reproduction. The memory 32 stores programs. Moreover, the memory 32 also serves as a FIFO (First in, First Out) that temporarily retains the content.

The CPU 31 reads out a program from the memory 32 and executes the read-out program.

Although not shown, the wireless speaker 302 includes a configuration similar to that of the wireless speaker 301. The bar speaker 400 also includes a configuration similar to that of the wireless speaker 301. But the bar speaker 400 is different from the wireless speaker 301 in that it includes a plurality of speaker units arranged in a row.

The AV receiver 100, the wireless speakers 301, 302, and the bar speaker 400 respectively execute the programs, and operate for a synchronized reproduction of the audio data in the following manner.

FIG. 3 is a flow chart showing an entire operation of the AV receiver. FIG. 4 is a flow chart showing operations of the AV receiver 100 and the wireless speaker 301a that are concerned with delivery of the audio data. Here in FIG. 4, operation of the wireless speaker 301 is representatively shown. Operations of the wireless speaker 302 and the bar speaker 400 are similar to that of the wireless speaker 301.

As shown in FIG. 3, the AV receiver 100 sets PCM audio source data to deliver (S1). For example, the CPU 1, based on operations accepted by a plurality of operation buttons 6 (for example, an input operation of a data number), sets PCM audio source data to deliver from a plurality of PCM audio source data stored in the content storage apparatus 150. The CPU 1 controls the wireless module 4 to acquire the set PCM audio source data from the content storage apparatus 150.

The CPU 1, upon setting the PCM audio source data to deliver (S1), determines whether or not the number of pieces of the apparatus as destinations is 3 or more (S21). The number of pieces of the apparatuses as destinations can be determined by the CPU 1 referring to a table of reproduction apparatus as destinations that is stored in the memory 2 and stores IP addresses of the wireless speakers 301, 302 and the bar speaker 400.

If the number of pieces of the apparatuses as destinations is 3 or more (S21:Y), the CPU 1, using the WavPack codec (in hybrid mode), compresses the PCM audio source data (for example, with a bit rate of 1,411 kbps) stored in the content storage apparatus 150 (S22). Then, data of the fundamental component of the PCM audio source data are produced. The data of the fundamental component are ones obtained from the PCM audio source data undergoing a lossy compression with a bit rate of 200 kbps, for example.

Then, the CPU 1 produces packets that include the data of the fundamental component, and outputs the packets to the wireless module 4 (S23). The wireless module 4 transmits the packets that are sequentially input according to the UDP (User Datagram Protocol). The packets are transmitted to the wireless speakers 301, 302 and the bar speaker 400 through the wireless access point 500.

Although not shown, if the AV receiver 100 receives a retransmission request from the wireless speakers 301, 302 and the bar speaker 400 while transmitting the data of the fundamental component, the AV receiver 100 retransmits the data of the fundamental component that correspond to the retransmission request.

If the number of pieces of the apparatus as destinations is less than 3 (S21:N), the CPU 1, using the WavPack codec (in hybrid mode), compresses the PCM audio source data stored in the content storage apparatus 150 (S24). In the compression at step S24, data of both the fundamental component and the extended component are produced. Correcting the data of the fundamental component using the data of the extended component makes it possible to restore the PCM audio source data without any loss due to compression. The data of the extended component are produced at a bit rate of 600 kbp, for example.

The CPU 1, upon producing the data of the fundamental component and the extended component by compressing the PCM audio source data (S24), delivers the produced data of the fundamental component and the extended component (S25).

As shown in FIG. 9, the CPU 1 can perform a process of S24 (producing the fundamental component and the extended component) before a condition judgment of S21. In this case, the CPU 1 performs the condition judgment of S21 after the process of S24, and delivers the component that depends on the condition.

Detailed operation at step S25 and thereto corresponding operation of the wireless speaker 301 are explained, referring to FIG. 4. As shown in FIG. 4, the CPU 1 takes out, from the data of the fundamental component and the data of the extended component, respective 1024 bytes of data from respective heads of the respective data, and produces packets that include the taken-out data (S31).

Then, the CPU 1 outputs the produced packets to the wireless module 4. The wireless module 4 performs wireless transmission of the inputted packets according to the UDP (S32). The packets are transmitted to the wireless speakers 301, 302 and the bar speaker 400 through the wireless access point 500. Then, the CPU 1 determines whether or not next data to deliver exist (S33). The CPU 1, upon determining that next data to deliver exists (S33:Y), returns to step S31. The CPU 1, upon determining that next data to deliver does not exist (S33:N), ends the process. That is, production of the packets and transmission thereof at step S31 and step S32 are performed repeatedly from the respective heads to the respective tails of the data of the fundamental component and the data of the extended component.

As shown in FIG. 4, the wireless module 34 of the wireless speaker 301 receives the transmitted packets through the wireless access point 500 (S51). When the wireless module 34 receives the packets, the CPU 31 of the wireless speaker 301 determines whether or not there is any loss in the received packets (S52). For example, the packet loss can be detected by referring to sequential numbers included in the packets. Specifically, if a packet of sequential number 0005 is received in a situation where packets of sequential numbers 0001, 0002 and 0003 have been received (S51), the CPU 31 determines that a packet of sequential number 004 has not been received and detects the loss of the packet (S52:Y).

If any packet loss is not detected (S52:N), the CPU 31 takes out the data of the fundamental component and the extended component from the received packets (S53). Being input to the FIFO, the taken-out data are buffered (S54).

In a reproduction process at step S55, the CPU 31 takes out the data from the FIFO. Then, the CPU 31, using the WavPack codec, decodes the data taken out from the FIFO. This enables the CPU 31 to restore the PCM audio source data (1,411 kbps) without loss due to compression. Then, the CPU 31 performs D/A conversion of the PCM audio source data, and outputs analog audio signals to the AMP 35. The speaker unit emits sounds based on audio signals amplified by the AMP 35.

The reproduction process at step S55 is started at specified times (for example, 10 o'clock 55 minutes 8 seconds and 10 milliseconds) that are included in data of respective packets, to achieve synchronization of reproduction time between the delivery source and a plurality of destinations.

When not detecting any packet loss (S52:N), the CPU 31 performs a streaming reproduction in which the received data are reproduced sequentially while receiving the data that are sequentially transmitted from the heads of the respective data of the fundamental component and the extended component (S51 and S53-S55).

When detecting the packet loss (S52:Y), the CPU 31 sends a retransmission request for the (range of) lost packet(s) to the AV receiver 100 (S56). The retransmission request includes a sequential number of a lost packet (for example, 0004). Additionally, the CPU 31 can control the wireless module 34 to perform a transmission according to the TCP (Transmission Control Protocol) using the 3 Way Handshake method. This ensures the retransmission request to be delivered to the AV receiver 100 more surely.

When the wireless module 4 receives the retransmission request (S41:Y), the CPU 1 of the AV receiver 100 identifies a packet to which the sequential number (0004) included in the retransmission request is attached (S42). The identified packet is the packet that has not arrived at the wireless speaker 301, and is the packet to retransmit. Here, the AV receiver 100 is expected to temporarily store transmitted packets in the memory 2 to enable retransmission of the packets. Then, the CPU 1 identifies the packet to retransmit by referring to the memory 2 using the sequential number included in the retransmission request.

At step S42, when identifying the packet to retransmit, the CPU 1 identifies only a packet corresponding to the data of the fundamental component. In other words, even when receiving a retransmission request for a packet corresponding to the data of the extended component (although no such retransmission request is expected to receive), the CPU 1 does not identify any packet to retransmit nor perform retransmission (otherwise, it can transmit a fundamental portion even when an extended portion is requested). Since the CPU 1 does not need to temporarily store the packets of the data of the extended component that do not have any chance of retransmission, it is possible to save consumption of the memory 2.

The CPU 1 controls the wireless module 4 to retransmit the identified packet (S43). In this case, as with step S56, to deliver the retransmission packet securely, the CPU 1 can perform the transmission according to the TCP. Moreover, the packet to retransmit includes flag information indicating retransmission so that, even when it is broadcast, there is no possibility that duplicated audio data is reproduced.

When the wireless module 34 receives the retransmission packet (S57), the CPU 31 of the wireless speaker 301 takes out the data of the fundamental component from the retransmission packet (S58).

The CPU 31 inputs the data taken out at step S58 to the FIFO to buffer (S54). In this case, the CPU 31 inputs the received packets to the FIFO in sequence. For example, the CPU 31 inputs, together with the packet of sequential number 0004 that is received via retransmission, the packet of sequential number 0005 to the FIFO in order of sequential number (S54). As stated above, the retransmitted data are only of the fundamental component. Therefore, when data of the extended component that corresponds to data of the fundamental component does not exist, the CPU 31 performs a reproduction with only the data of the fundamental component (S55).

After that, the process returns to step S51, and the wireless module 34 receives subsequently transmitted packets. Thus, the wireless speaker 301, even when once resulting in reproducing audio signals of only the fundamental component, if no packet loss is detected thereafter, reproduces the PCM audio source data without loss due to compression.

As described above, the AV receiver 100 delivers high quality audio data having both the fundamental component and the extended component in the case where the number of speakers as destinations is small and there is enough room in the network band.

Also, the AV receiver 100, by delivering only data of the fundamental component (S23), is capable of delivering the data to a large number of destinations, in the case where the number of speakers as destinations is large and there is not enough room in the network band. This enables the AV receiver 100 to prevent delivery delays regardless of the number of speakers as destinations. Further, when it becomes necessary to retransmit the audio data, the AV receiver 100 retransmits only the data of the fundamental component (S43), thereby minimizing the data size to retransmit. This enables the AV receiver 100 to prevent retransmission delay as well.

Therefore, the AV receiver 100 according to this embodiment is capable of preventing delays in audio data delivery while delivering as much higher quality audio data as possible, depending on the number of speakers as destinations.

Returning to FIG. 3, the AV receiver 100, in addition to delivering the audio data (S23, S25), reproduces the audio data also at its own apparatus. Specifically, the CPU 1 first sets the PCM audio source data to deliver (S1), and then performs a synchronization process to synchronize the reproduction timing of the audio data at each apparatus (S11). In this synchronization process, the CPU 1 writes the PCM audio source data acquired from the content storage apparatus 150 onto the FIFO from the head of the data in sequence. The data is stored in the FIFO for a predetermined time. The predetermined time is set taking account of the times needed for the reproduction process at the DSP 3, delivery of the audio data to the wireless speakers 301, 302 and the bar speaker 400 (network delay), and the reproduction processes at the wireless speakers 301, 302 and the bar speaker 400, etc. (e.g., 2 seconds).

Then, the CPU 1 performs the reproduction process of the PCM audio source data (S12). Specifically, the CPU 1 takes out the data from the FIFO, and outputs the data to the DSP 3. The DSP 3, after performing a predetermined acoustic treatment to the data, performs D/A conversion of the data, and outputs analog audio signals to the AMP 5. The AMP 5 amplifies the analog audio signals, and outputs the amplified audio signals to the speakers 200L, 200R.

The CPU 1 determines whether or not next data to reproduce exists (S13). The CPU 1, upon determining that next data to reproduce exists (S13:Y), returns to step S11. The CPU 1, upon determining that next data to reproduce does not exist (S13:N), ends the process. That is, the CPU 1 performs the steps S11 and S12 repeatedly, from the head to the tail of the PCM audio source data to reproduce.

The content delivery system 900, which prevents the delivery delay regardless of the number of speakers as destinations as described above, is capable of causing the AV receiver 100, the wireless speakers 301, 302, and the bar speaker 400 to reproduce the audio data synchronously.

Additionally, the compression at step S22 in FIG. 3 only needs to produce the data of the fundamental component, and thus can be performed using a codec different form the one used at step S24. For example, the CPU 1 uses at step S22 a codec with a higher compression ratio compared to the WavPack codec. This enables the data size to deliver at step S23 to be further reduced.

Figure 5:
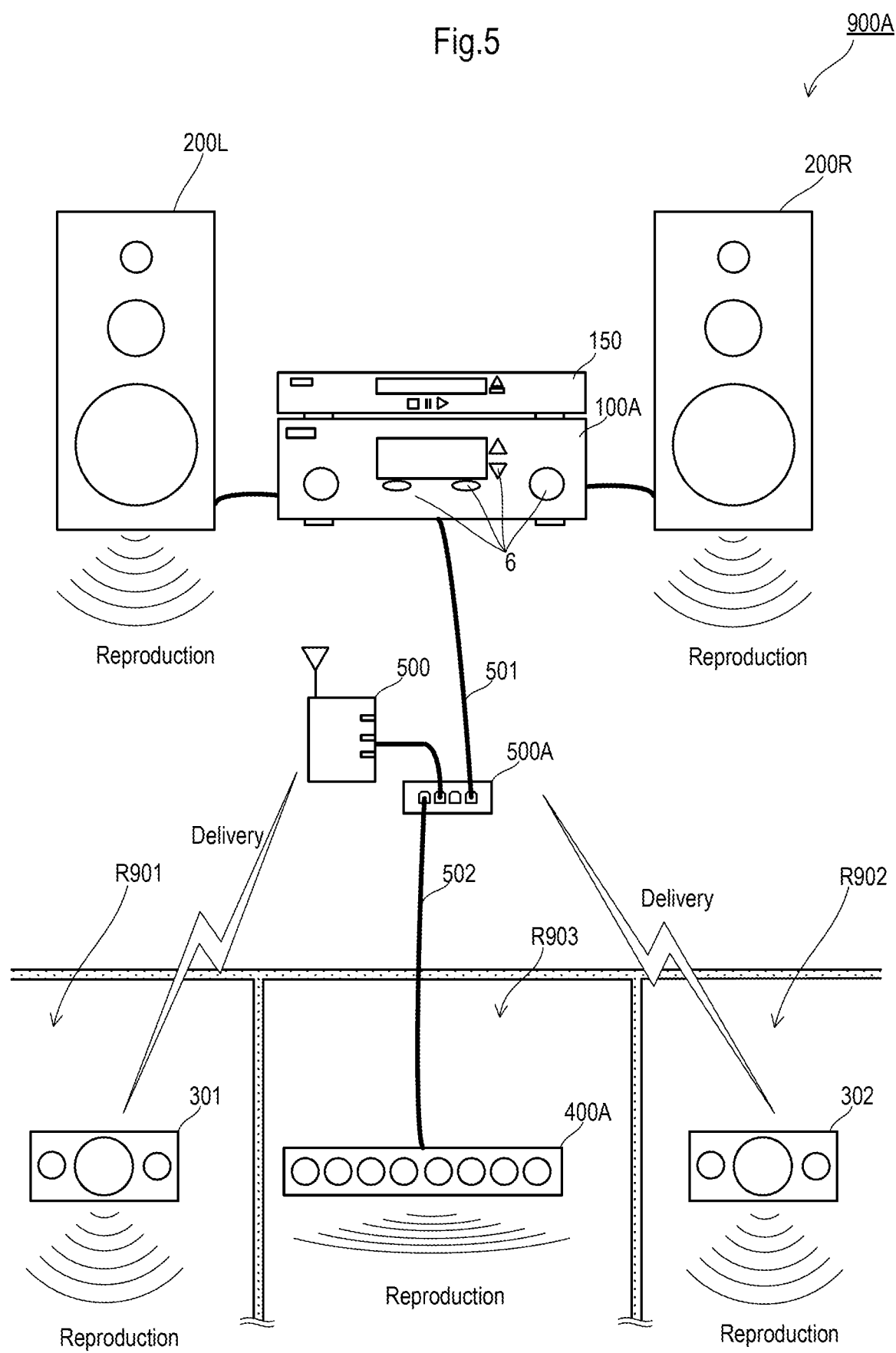
FIG. 5 is an illustration to explain an outline of a content delivery system according to an embodiment 2 of the present invention.
Figure 6:
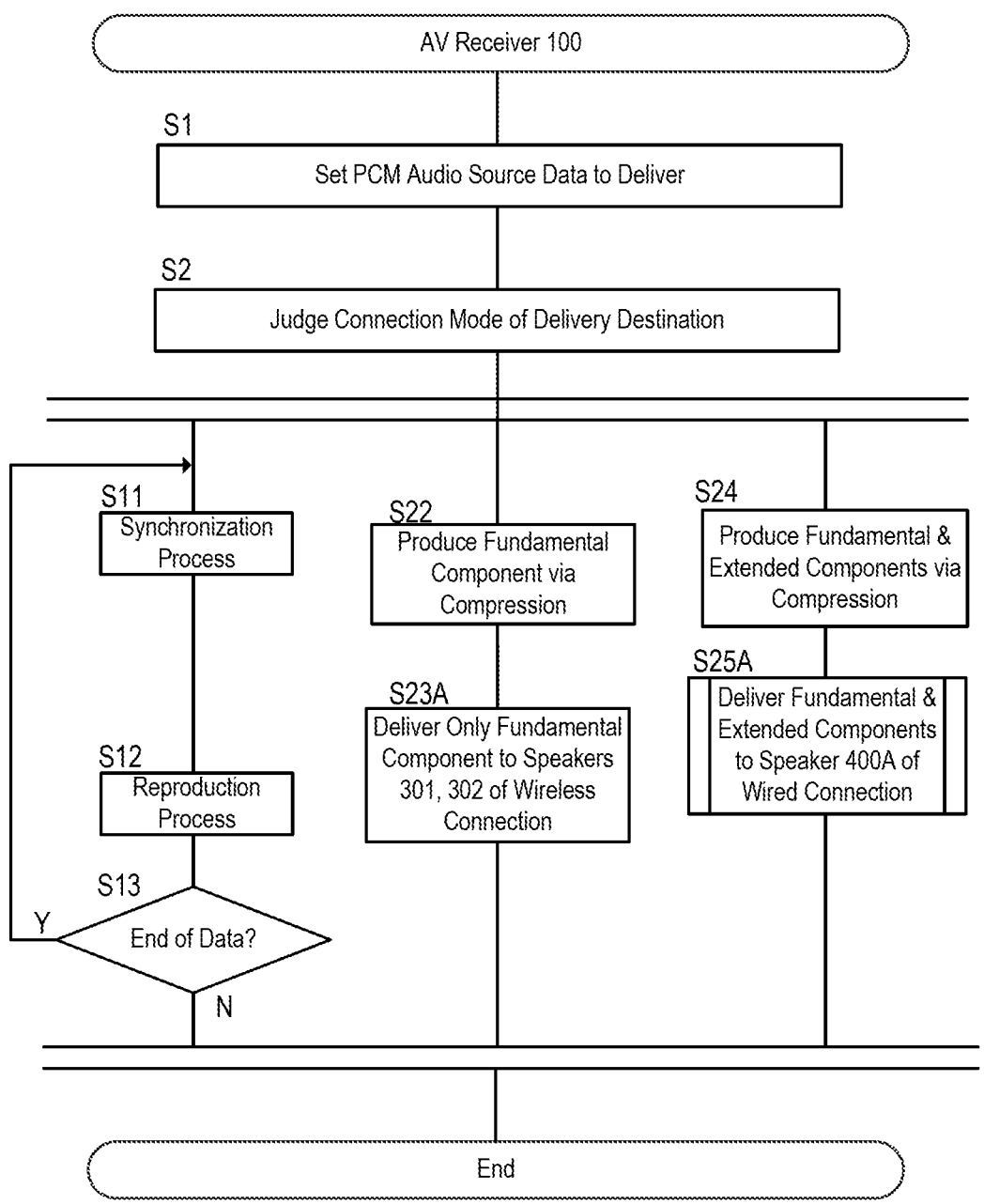
FIG. 6 is a flow chart showing an entire operation of an AV receiver in the embodiment 2.

The above-mentioned examples are shown taking the number of speakers as destinations as a user's environment. But the user's environment can be network connection modes, as shown in the following embodiment 2. FIG. 5 is an illustration to explain an outline of a content delivery system 900A according to an embodiment 2 of the present invention. FIG. 6 is a flow chart to show an operation of an AV receiver 100A in the embodiment 2.

The content delivery system 900A according to the embodiment 2 is different from the content delivery system 900 according to the embodiment 1 in that the embodiment 2 includes an AV receiver 100A and a bar speaker 400A provided with wired connection between each other.

The AV receiver 100A and the bar speaker 400A each have a wired LAN interface (not shown). As shown in FIG. 5, the AV receiver 100A is connected to a switching hub 500A through a LAN cable 501. The bar speaker 400A is connected to the switching hub 500A through a LAN cable 502. This ensures that a network path is established between the AV receiver 100A and the bar speaker 400A at a transmission rate of 1 Gbps, for example. Network paths between the AV receiver 100A and the wireless speakers 301, 302 are established at a transmission rate of 300 Mbps, for example. In the network connection mode in the embodiment 2, however, only the bar speaker 400A can be provided with wired connection to the switching hub 500A.

As shown in FIG. 6, the AV receiver 100A changes data to deliver depending on whether the speaker as audio data destination is provided with wired connection or wireless connection to the network. Specifically, in this case as well, the connection modes are known by referring to the table of reproduction apparatus as destinations that is stored in the memory 2. Operation of the AV receiver 100A is different from the operation shown in FIG. 3 in that step S21 is not performed, but rather steps S2, S23A and S25A are performed.

At step S2, the CPU 1 judges the network connection modes of the speakers as destinations. Specifically, the CPU 1 refers to the table of reproduction apparatus as destinations that is stored in the memory 2 to know the information showing whether the wireless speakers 301, 302 and the bar speaker 400A are respectively provided with wired connection or wireless connection to the network, and determines the network connection modes.

Operation at step S23A differs from the operation at step S23 in FIG. 3 in that only the data of the fundamental component of the PCM audio source data after having been compressed are delivered to the wireless speaker 301 and the wireless speaker 302. Operation at step S25A differs from the operation at step S25 in FIG. 3 in that the data of both the fundamental component and the extended component of the PCM audio source data after having been compressed are delivered to the bar speaker 400A. Therefore, the bar speaker 400A, when detecting the packet loss, sends a request for retransmission to the AV receiver 100A. The AV receiver 100A then retransmits only the data of the fundamental component corresponding to the retransmission request.

Moreover, to transmit different data for each speaker whose connection mode is different from each other (S23A, S25A), the CPU 1 produces UDP packets with different port numbers. But to transmit different data for each speaker, the CPU 1 can produce TCP packets specifying destinations.

The AV receiver 100A in the embodiment 2 delivers audio data of large data size to the bar speaker 400A that is provided with wired connection, the network band there of having enough room and stable data transmission. The AV receiver 100A delivers audio data of small data size to the wireless speaker 301 and the wireless speaker 302 that are provided with wireless connection, the network band thereof having not enough room and likely unstable data transmission. Thus, the AV receiver 100A prevents delays in delivery of the audio data to the wireless speaker 301 and the wireless speaker 302 that are provided with wireless connection, the network band thereof having not relatively enough room and likely unstable data transmission.

Also, the AV receiver 100A, when retransmitting the audio data to the bar speaker 400A that is provided with wired connection, the network band thereof having enough room and stable data transmission, reduces data size of the data to retransmit, preventing retransmission delays. The AV receiver 100A according to the embodiment 2 is capable of preventing delays in audio data delivery while delivering as much higher quality audio data as possible, depending on the network connection modes.

Figure 7:
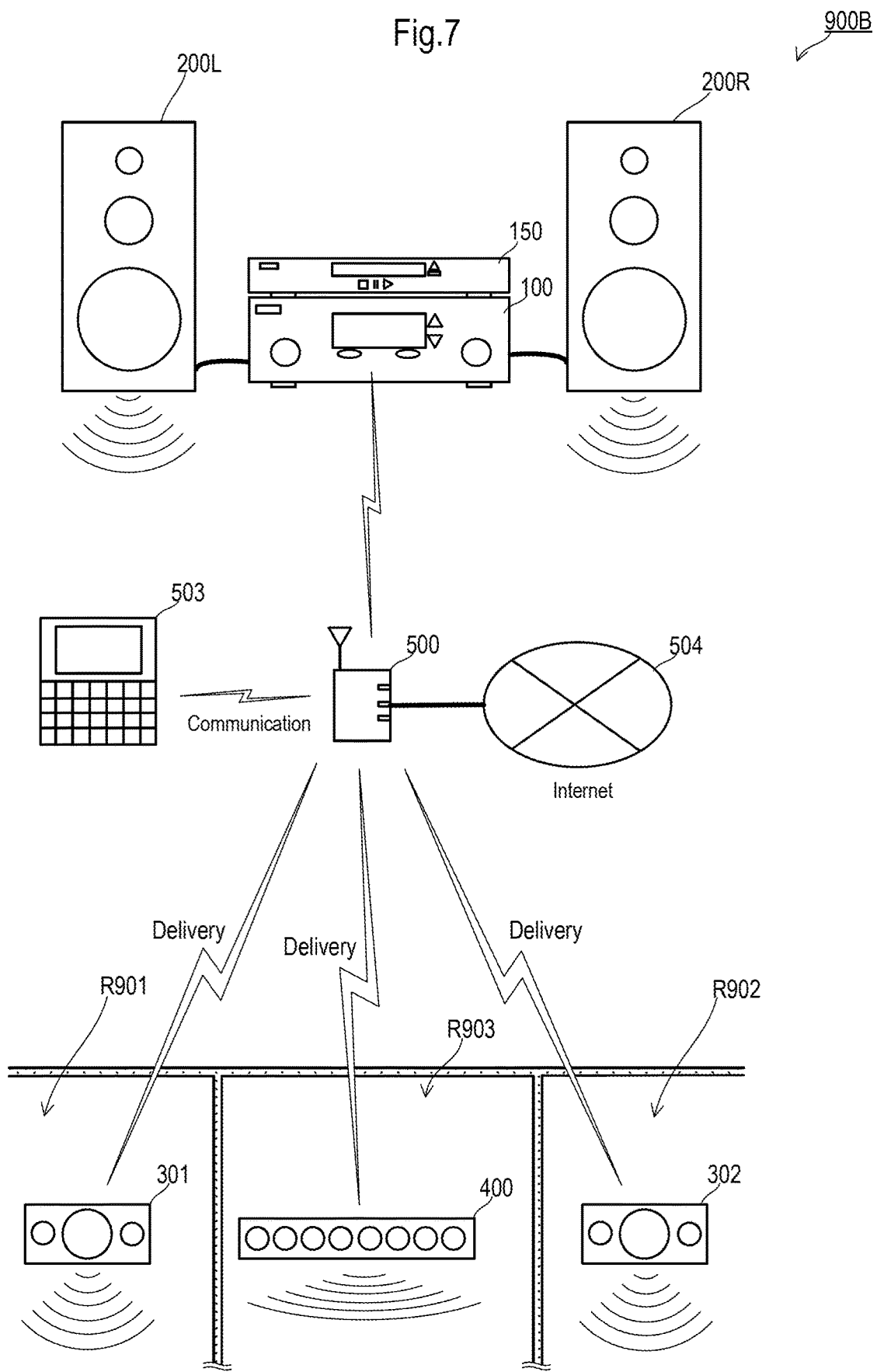
FIG. 7 is an illustration showing a network connection mode of a content delivery system according to an embodiment 3 of the present invention.
Figure 8:
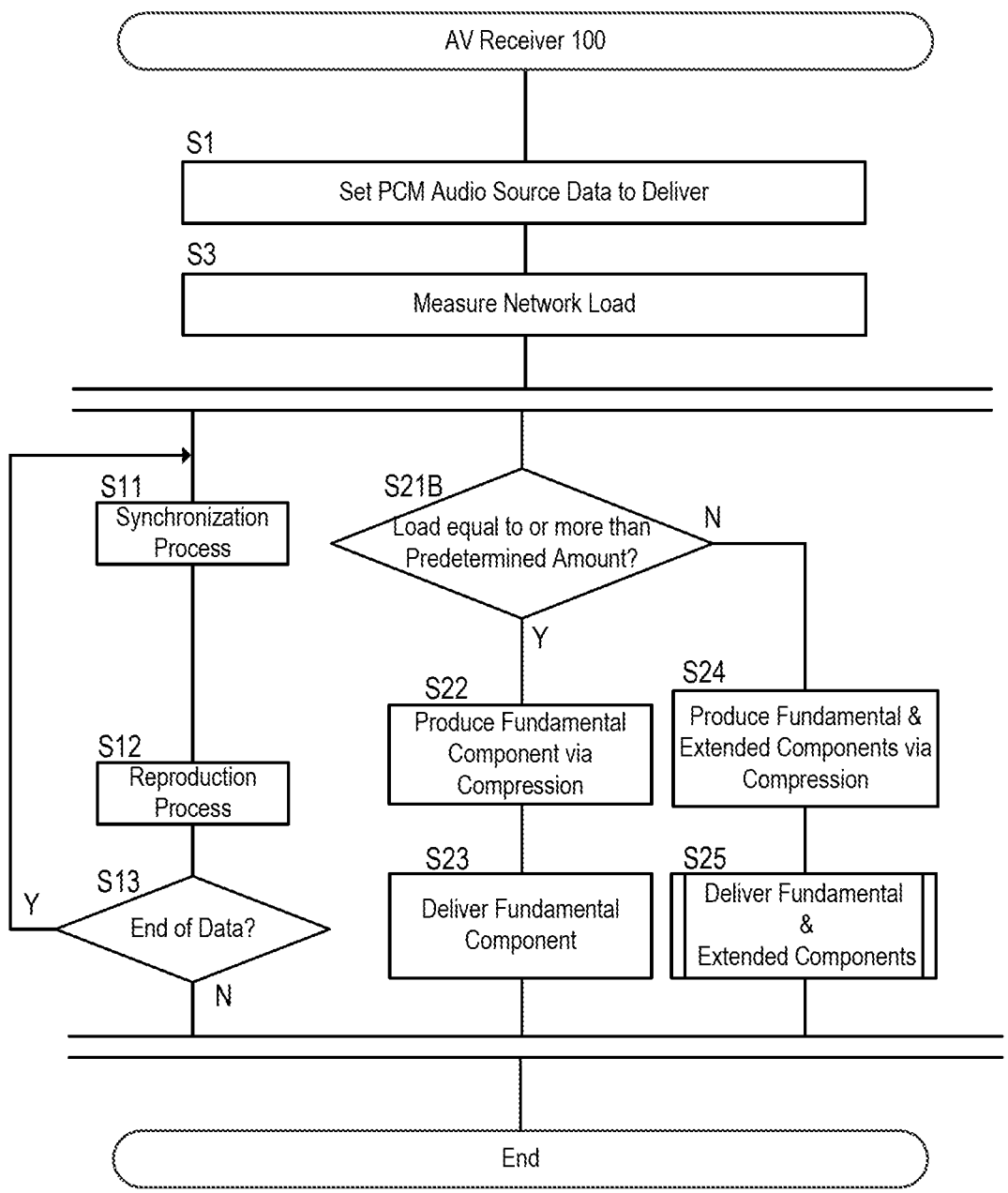
FIG. 8 is a flow chart showing an entire operation of the AV receiver in the embodiment 3.

FIG. 7 is an illustration showing network connection modes of a content delivery system 900B according to an embodiment 3 of the present invention. FIG. 8 is a flow chart showing an operation of the AV receiver 100 in the embodiment 3.

In the network connection modes shown in FIGS. 7, 8, the AV receiver 100, depending on a network load, delivers either only the data of the fundamental component or the data of both the fundamental component and the extended component of the PCM audio source data after having been compressed.

As shown in FIG. 7, an Internet terminal 503 communicates with each apparatus on the Internet 504 through the wireless access point 500. In this manner, the wireless access point 500 is shared by the content delivery system 900 and the Internet terminal 503 for audio data delivery and communication, respectively. Therefore, load to the wireless access point 500 here is increased compared with the network connection case in the embodiment 1.

As shown in FIG. 8, the CPU 1 of the AV receiver 100, upon setting the PCM audio source data to deliver (S1), makes a measurement of the network load (S3). Specifically, at step S3, the CPU 1 sends a traffic acquisition request to the wireless access point 500, and controls the wireless module 4 to receive the response.

The CPU 1, upon measuring the network load (S3), determines whether or not the load is equal to or more than a predetermined amount (S21B). For example, the CPU 1 calculates the extent to which the acquired traffic (for example, 50 Mbps) occupies against a theoretical rate (300 Mbps) of the wireless access point 500 on radio communication standards. Then, the CPU 1 determines whether or not the proportion is equal to or more than 50%.

The CPU 1, upon determining that the load is equal to or more than the predetermined amount (S21B:Y), delivers only the data of the fundamental component of the PCM audio source data after having been compressed to the wireless speakers 301, 302 and the bar speaker 400 (S23). The CPU 1, upon determining that the network load is less than the predetermined amount (S21B:N), delivers the data of both the fundamental component and the extended component of the PCM audio source data after having been compressed to the wireless speakers 301, 302, and the bar speaker 400 (S25).

As stated above, the AV receiver 100 is capable of preventing delays in audio data delivery while delivering high quality audio data depending on the network load.

Also, the AV receiver 100 can measure the network load (S3) during the delivery of the audio data. This allows the AV receiver 100 to switch the audio data to deliver to the data of only the fundamental component depending on the increased load even when the network load increases in real time due to the communication by the Internet terminal 503 and/or retransmission of the audio data during the delivery of the audio data. After that, when the network load decreases in real time, the AV receiver 100, to deliver the data of both the fundamental component and the extended component of the PCM audio source data after having been compressed, switches to the reproduction of the PCM audio source data without loss due to compression.

Moreover, measurement of the network load at step S3 in FIG. 8 can be made by acquiring the traffic at the wireless module 4 of its own apparatus.

Also, the AV receiver 100 can switch the data to deliver based on response speeds of the wireless speakers 301, 302 and the bar speaker 400, not limited to the network load. For example, the AV receiver 100 transmits a PING command to the wireless speakers 301, 302 and the bar speaker 400, and measures their response times. Then, if the response speed of a speaker as destination is less than, for example, 10 ms, the AV receiver 100 delivers the data of both the fundamental component and the extended component of the PCM audio source data after having been compressed. If, however, the response speed of a speaker as destination is equal to or more than 10 ms, the AV receiver 100 delivers the data of only the fundamental component of the PCM audio source data after having been compressed.

Also, the AV receiver 100 can switch the data to deliver depending on distances of the wireless speakers 301, 302 and the bar speaker 400. For example, the AV receiver 100 acquires RSSI (Received Signal Strength Indicator) information from the wireless access point 500. The RSSI information includes information on the strength (dBm) of radio signals received by the wireless speakers 301, 302 and the bar speaker 400. The strength depends on the distances between the wireless access point 500 and each of the speakers. On that account, speakers at which the strength is larger than −50 dBm, for example, the AV receiver 100 delivers the data of both the fundamental component and the extended component of the PCM audio source data after having been compressed.

In the above-mentioned examples, the AV receiver 100 and the AV receiver 100A both produce the fundamental component and the extended component of the PCM audio source data at their own apparatus by performing the compression using the WavPack codec. Otherwise, even just delivering the data of the fundamental component and the extended component that are stored beforehand in the content storage apparatus 150 can be acceptable.

Moreover, although audio data are illustrated as content in the above-mentioned examples, the content can include video data. For example, to compress uncompressed AVI data in a state of being divided into the fundamental component and the extended component, the MPEG 4 SLS codec can be used.

Also, in the above-mentioned examples, the AV receiver 100 and the AV receiver 100A deliver audio data. Instead, either of the wireless speaker 301, the wireless speaker 302, the bar speaker 400, and the bar speaker 400A can deliver the audio data. Further, a smart phone connectable to the wireless access point 500 can deliver the audio data.

Also, radio communication can be achieved, not limited to Wi-Fi (a registered trademark) standard, according to Bluetooth (a registered trademark) standard.

Moreover, in the above embodiments, shown are examples where the AV receiver 100 acquires the PCM audio source data stored in the content storage apparatus 150. Instead of the content storage apparatus 150, content can be acquired from a media reproduction apparatus, such as a CD player, etc., or from a server, etc., through the network.

The foregoing preferred embodiments are merely illustrative and should not be construed to limit the present invention. The scope of the present invention is defined not by the foregoing preferred embodiment but by the following claims. Further, the scope of the present invention is intended to include all modifications within the scopes of the claims and within the meanings and scopes of equivalents.

What is claimed is:

1. A content transmission apparatus comprising:
   at least one processor configured to implement stored instructions and execute a plurality of tasks, including:
      a compression task that performs compression of data to divide content thereof into a fundamental component and an extended component;
      a transmission task that transmits the content to a client apparatus; and
      a reception task that receives a retransmission request for the content from the client apparatus,
   wherein the transmission task:
      determines, depending on a communication condition, which includes a condition relating to number of client apparatuses as transmission destinations, whether to transmit data corresponding to the fundamental component of the content or data corresponding to both the fundamental component and the extended component of the content together;
      transmits:
         the data corresponding to both the fundamental component and the extended component of the content when the number of client apparatuses is equal to or less than a predetermined number; and
         the data corresponding to the fundamental component of the content when the number of client apparatuses is more than the predetermined number; and
      upon the reception task receiving the retransmission request from the client apparatus regarding part of the content not received by the client apparatus, identifies only a packet corresponding to the data corresponding to the fundamental component of the content as the part, and retransmits only the data corresponding to the fundamental component of the content without retransmitting data corresponding to the extended component of the content;
      causes the client apparatus to reproduce:
         when the data corresponding to both the fundamental component and the extended component of the content are received, both the fundamental component and the extended component of the content without loss due to compression; and
         when only the data corresponding to the fundamental component of the content is received, only the fundamental component of the content with loss due to the compression.

2. The content transmission apparatus according to claim 1, wherein:
   the communication condition includes a condition relating to a network connection mode of the client apparatus as a transmission destination; and
   the transmission task transmits:
      the data corresponding to both the fundamental component and the extended component of the content when the client apparatus is provided with wired connection to a network; and the data corresponding to the fundamental component of the content when the client apparatus provided with a wireless connection to the network.

3. The content transmission apparatus according to claim 1, wherein:

the communication condition includes a condition relating to a response speed of the client apparatus as a transmission destination; and the transmission task transmits:

the data corresponding to both the fundamental component and the extended component of the content when the response speed of the client apparatus is equal to or more than a predetermined speed; and the data corresponding to the fundamental component of the content when the response speed of the client apparatus is less than the predetermined speed.

4. The content transmission apparatus according to claim 1, wherein:

the communication condition includes a condition relating to a network load; and the transmission task transmits:

the data corresponding to both the fundamental component and the extended component of the content when the load is equal to or less than a predetermined amount; and the data corresponding to the fundamental component of the content when the load is more than the predetermined amount.

5. The content transmission apparatus according to claim 1, wherein:

the communication condition includes a condition relating to a distance in a network; and the transmission task transmits:

the data corresponding to both the fundamental component and the extended component of the content to the client apparatus when a distance between the content transmission apparatus and the client apparatus is less than a predetermined value; and the data corresponding to both the fundamental component of the content to the client apparatus when the distance between the content transmission apparatus and the client apparatus is equal to or more than the predetermined value.

6. The content transmission apparatus according to claim 1, wherein:

the data corresponding to the fundamental component is data that have undergone lossy compression, and the data corresponding to the extended component is data that corrects the fundamental component.

7. A content delivery system comprising:

a content transmission apparatus; and a client apparatus configured to receive data containing content from the content transmission apparatus; and wherein the content transmission apparatus comprises:

at least one processor configured to implement stored instructions and execute a plurality of tasks, including:

a compression task that performs compression of the received data to divide the content thereof into a fundamental component and an extended component;

a transmission task that transmits the content to the client apparatus; and a reception task that receives a retransmission request for the content, wherein the transmission task:

determines, depending on a communication condition, which includes a condition relating to number of client apparatuses as transmission destinations, whether to transmit data corresponding to the fundamental component of the content or data corresponding to both the fundamental component and the extended component of the content together; and transmits:

the data corresponding to both the fundamental component and the extended component of the content when the number of client apparatuses is equal to or less than a predetermined number; and the data corresponding to the fundamental component of the content when the number of client apparatuses is more than the predetermined number, and upon the reception task receiving the retransmission request from the client apparatus regarding part of the content not being received by the client apparatus, identifies only a packet corresponding to the data corresponding to the fundamental component of the content as the part, and retransmits only the data corresponding to the fundamental component of the content without retransmitting data corresponding to the extended component of the content; and wherein the client apparatus reproduces:

when the data corresponding to both the fundamental component and the extended component of the content are received, both the fundamental component and the extended component of the content without loss due to compression; and when only the data corresponding to the fundamental component of the content is received, only the fundamental component of the content with loss due to the compression.

8. The content delivery system according to claim 7, wherein:

the communication condition includes a condition relating to a network connection mode of the client apparatus as a transmission destination; and the transmission task transmits:

the data corresponding to both the fundamental component and the extended component of the content when the client apparatus is provided with wired connection to a network; and the data corresponding to the fundamental component of the content when the client apparatus is provided with wireless connection to the network.

9. The content delivery system according to claim 7, wherein:

the communication condition includes a condition relating to a response speed of the client apparatus as a transmission destination; and the transmission task transmits:

the data corresponding to both the fundamental component and the extended component of the content when the response speed of the client apparatus is equal to or more than a predetermined speed; and the data corresponding to the fundamental component of the content when the response speed of the client apparatus is less than the predetermined speed.

10. The content delivery system according to claim 7, wherein:

the communication condition includes a condition relating to a network load; and the transmission task transmits:

the data corresponding to both the fundamental component and the extended component of the content when the load is equal to or less than a predetermined amount; and the data corresponding to the fundamental component of the content when the load is more than the predetermined amount.

11. The content delivery system according to claim 7, wherein:

the communication condition includes a condition relating to a distance in a network; and the transmission task transmits:

the data corresponding to both the fundamental component and the extended component of the content to the client apparatus when a distance between the content transmission apparatus and the client apparatus is less than a predetermined value; and the data corresponding to the fundamental component of the content to the client apparatus when the distance between the content transmission apparatus and the client apparatus is equal to or more than the predetermined value.

12. A content transmission method comprising the steps of:

compressing data to divide content thereof into a fundamental component and an extended component;

transmitting the content to a client apparatus; and receiving a retransmission request for the content from the client apparatus, wherein the transmitting step include the steps of:

determining, depending on a communication condition, which includes a condition relating to number of client apparatuses as transmission destinations, whether to transmit data corresponding to the fundamental component of the content or data corresponding to both the fundamental component and the extended component of the content together;

transmitting the data corresponding to both the fundamental component and the extended component of the content when the number of client apparatuses is equal to or less than a predetermined number;

the data corresponding to the fundamental component of the content when the number of client apparatuses is more than the predetermined number;

upon receiving the retransmission request from the client apparatus regarding part of the content not being received by the client apparatus, identifying only a packet corresponding to the data corresponding to the fundamental component of the content as the part, and retransmitting only the data corresponding to the fundamental component of the content without retransmitting data corresponding to the extended component of the content;

causing the client apparatus to reproduce, when the data corresponding to both the fundamental component and the extended component of the content are received, both the fundamental component and the extended component of the content without loss due to compression; and causing the client apparatus to reproduce, when only the data corresponding to the fundamental component of the content is received, only the fundamental component of the content with loss due to the compression.

13. The content transmission method according to claim 12, wherein:

the communication condition includes a condition relating to a network connection mode of the client apparatus as a transmission destination, and the transmitting step transmits:

the data corresponding to both the fundamental component and the extended component of the content when the client apparatus is provided with wired connection to a network; and the data corresponding to the fundamental component of the content when the client apparatus is provided with wireless connection to the network.

14. The content transmission method according to claim 12, wherein:

the communication condition includes a condition relating to a response speed of the client apparatus as a transmission destination, and the transmitting step transmits:

the data corresponding to both the fundamental component and the extended component of the content when the response speed of the client apparatus is equal to or more than a predetermined speed; and the data corresponding to the fundamental component of the content when the response speed of the client apparatus is less than the predetermined speed.

15. The content transmission method according to claim 12, wherein:

the communication condition includes a condition relating to a network load, and the transmitting step transmits:

the data corresponding to both the fundamental component and the extended component of the content when the load is equal to or less than a predetermined amount; and the data corresponding to the fundamental component of the content when the load is more than the predetermined amount.

16. The content transmission method according to claim 12, wherein:

the communication condition includes a condition relating to a distance in a network, and the transmitting step transmits:

the data corresponding to both the fundamental component and the extended component of the content to the client apparatus when a distance between the content transmission apparatus and the client apparatus is less than a predetermined value; and the data corresponding to the fundamental component of the content to the client apparatus when the distance between the content transmission apparatus and the client apparatus is equal to or more than the predetermined value.

17. The content transmission method according to claim 12, wherein:

the data corresponding to the fundamental component is data that have undergone lossy compression, and the data corresponding to the extended component is data that corrects the fundamental component.

* * * * *